United States Patent
Gilbert et al.

(10) Patent No.: US 7,928,356 B2
(45) Date of Patent: Apr. 19, 2011

(54) QUANTUM SENSOR MINIATURIZATION UTILIZING ENTANGLED PHOTON SIGNALS

(75) Inventors: Gerald N. Gilbert, Manalapan, NJ (US); Michael D. Hamrick, Eatontown, NJ (US); Yaakov S. Weinstein, East Brunswick, NJ (US); Stephen P. Pappas, Roxbury, CT (US); Anthony Donadio, Matawan, NJ (US)

(73) Assignee: The MITRE Corporation, McLean, VA (US)

( * ) Notice: Subject to any disclaimer, the term of this patent is extended or adjusted under 35 U.S.C. 154(b) by 161 days.

(21) Appl. No.: 12/271,590

(22) Filed: Nov. 14, 2008

(65) Prior Publication Data

US 2010/0123091 A1    May 20, 2010

(51) Int. Cl.
  *G21G 4/00* (2006.01)
  *G02F 1/35* (2006.01)
(52) U.S. Cl. .......... 250/225; 250/493.1; 250/458.1; 356/364; 380/256; 380/277
(58) Field of Classification Search ............ 250/225, 250/216, 493.1, 458.1; 356/364; 380/256, 380/277
  See application file for complete search history.

(56) References Cited

U.S. PATENT DOCUMENTS 7,211,812 B2 * 5/2007 Takeuchi ............ 250/493.1

OTHER PUBLICATIONS

Boto, Agedi N. et al., "Quantum Interferometric Optical Lithography: Exploiting Entanglement to Beat the Diffraction Limit," Physical Review Letters. Sep. 25, 2000 85(13): 2733-2736.
Ekert, Artur K., "Quantum Cryptography Based on Bell's Theorem," Physical Review Letters. Aug. 5, 1991; 67(6):661-663.
Gilbert, G. et al., "Quantum Sensor Miniaturization," Photonics Technology Letters, IEEE vol. 19, Issue 22, Nov. 15, 2007 pp. 1798-1800.
Giovanetti, Vittorio, et al., "Quantum-Enhanced Measurements: Beating the Standard Quantum Limit," Science. Nov. 19, 2004: vol. 306. No. 5700, 11 pages.
Giovanetti, Vittorio, et al., "Quantum-Enhanced Positioning and Clock Synchronization," Nature 412, 417-419 (2001).
Jacobson et al., "Photonic de Broglie Waves," Physical Review Letters. Jun. 12, 1995, 74(12),4835-4838.
Kurtsiefer, C. et al., "Generation of Correlated Photon Pairs in Type-II Parametric Down Conversion—Revisited," Journal of Modern Optics, vol. 48, No. 13, pp. 1997-2007 (2001).
Strekalov, Dmitry V. et al., "Two-Photon Interferometry for High-Resolution Imaging," Journal of Modern Optics, vol. 49, No. 3/4 519-527 (2002).
Winker, David M. et al., "An overview of LITE: NASA's Lidar In-space Technology Experiment" IEEE, Feb. 1996, vol. 84, Issue: 2. pp. 164-180.

* cited by examiner

*Primary Examiner* — Seung C Sohn
(74) *Attorney, Agent, or Firm* — Sterne Kessler Goldstein & Fox PLLC (57) ABSTRACT

The resolution obtained by an imaging system utilizing separable photons can be achieved by an imaging system making use of entangled photons. Since resolution is not being increased from the separable-photon system, the imaging system utilizing entangled photons can take advantage of a smaller aperture. This results in a smaller and lighter system, which can be especially valuable in satellite imaging where weight and size play a vital role.

22 Claims, 5 Drawing Sheets

QUANTUM SENSOR MINIATURIZATION UTILIZING ENTANGLED PHOTON SIGNALS

BACKGROUND

1. Field of the Invention

Embodiments of the present invention relate to optical imaging, particularly optical imaging using a satellite or other exo-atmospheric platforms.

2. Related Art

Quantum mechanical systems admit certain correlations that are not classically defined. Physical systems that exhibit these nonclassical correlations are said to be entangled. Entanglement plays a central role in many emerging quantum technologies, such as quantum computing, quantum communications and cryptography, and quantum interferometry. Previously identified applications of quantum interferometry include quantum lithography, quantum geodesy, and quantum microscopy. Previously proposed applications of photonic interferometry rely in part on an effective reduction in diffraction that is exhibited by certain entangled states. This entanglement correlation has been exploited to achieve greater resolution in lithography and short-range imaging. However, entanglement has not been utilized in long-range imaging (such as from a satellite to ground) because a high degree of entanglement amongst the photons is needed to provide a meaningful improvement in resolution, but atmospheric degradation adversely affects the entangled photons in a manner such that they cannot be used.

BRIEF SUMMARY

The same resolution obtained by a long-range imaging system utilizing separable photons can be achieved using an imaging system using entangled photons, but with the advantage of a smaller transmission aperture. This results in a smaller and lighter system, which can be especially valuable in satellite imaging where weight and size play an important role.

In an embodiment, a system for optical imaging includes a photon source, a photon entanglement system, a transmitter, and a receiver. The photon source is configured to emit a beam of photons at a given wavelength. The photon entanglement system is configured to receive the beam of photons and emit a beam of entangled photons. The transmitter has an aperture, the aperture having an actual aperture diameter. The receiver has the capability of detecting entangled photons. The resolution of the system is approximately equal to the given wavelength divided by an effective aperture diameter that is greater than the actual aperture diameter and depends on the degree of entanglement amongst the photons.

In another embodiment, a system for optical imaging includes an exo-atmospheric source of entangled photons, an exo-atmospheric transmitting optic, and an exo-atmospheric receiver. Photons generated by the exo-atmospheric source of photons have a given wavelength. The transmitting optic is configured to transmit the entangled photons through a planetary atmosphere. The exo-atmospheric system has a predetermined resolution, such that the size of a transmitting aperture can be reduced dependent upon a state of the transmitted entangled photons.

In an embodiment, a method for optical imaging includes generating a beam of photons having a given wavelength, entangling photons in the beam of photons to produce an entangled beam of photons, transmitting the entangled beam of photons through an aperture to an object to be imaged, and receiving entangled photons reflected from the object. The entangled photons are transmitted at a resolution that is approximately equal to the given wavelength divided by an effective aperture diameter that is greater than an actual diameter of the aperture.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments of the present invention will be described with reference to the accompanying drawings. The drawing in which an element first appears is typically indicated by the leftmost digit(s) in the corresponding reference number.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

I. Introduction

Quantum mechanical systems admit certain correlations that are not classically defined. Physical systems that exhibit these nonclassical correlations are said to be entangled. Entangled photons are in a single quantum state such that their properties are correlated, even if the photons are located and/or measured separately from each other. Accordingly, if the properties of one photon in an entangled pair are identified, the properties of the other photon in the entangled pair are determined by the identified properties. Because of this, entangled photons are known to have unique resolving powers. For example, photon entanglement has previously been used as a method for increasing the resolution of a given interferometer system.

As will be described further below, such a technique has not previously been utilized in long-range (e.g., earth-to-satellite) imaging or communications systems, because atmospheric degradation causes severe loss of photons that are entangled at a high enough level to improve resolution. According to embodiments of the present invention, however, if a given resolution obtainable with unentangled light is sufficient for the presumed purpose at hand, entanglement may be exploited by trading any further resolution improvement for a corresponding reduction in size and weight of transmitting optics. Specifically, the use of particular signal states having N-entangled photons allows for a reduction of the diameter of the transmitting aperture while maintaining a particular resolution. A reduction in diameter results in a corresponding reduction in the volume and weight of the system. A reduction in the size and weight of the imaging system may be especially valuable in satellite imaging where size and weight play a vital role.

II. Photonic N00N States and Quantum Sensor Miniaturization

Previously proposed applications of photonic quantum interferometry rely on an effective reduction in diffraction that is exhibited by certain entangled states. This effective diffraction reduction has been exploited to achieve greater resolution in lithography and short-range imaging. The best possible imaging resolution $R_R$ that can be obtained using classical, nonentangled photons is given by the Rayleigh limit:

$$R_R \cong \frac{\lambda}{D}, \quad \text{(Eq. 1)}$$

where $\lambda$ is the wavelength of the light used by the imaging system and D is the diameter of the aperture. Imaging systems that employ quantum mechanical, entangled photons can exceed this resolution limit and achieve the Heisenberg limit:

$$R_H \cong \frac{\lambda}{DN}, \quad \text{(Eq. 2)}$$

where N is the number of photons in an entangled photon group.

A particular entangled state that can achieve the Heisenberg limit described in Eq. 2 is referred to as a N00N state. A N00N state is a particular N-photon path-entangled state. Given two spatial paths (A and B), the N00N state is given by:

$$|\psi_{N00N}\rangle = \frac{1}{\sqrt{2}}(|N_A 0_B\rangle + |0_A N_B\rangle). \quad \text{(Eq. 3)}$$

Upon measurement, all N photons will be observed in the same path, either A or B, with equal probability.

As noted above, the standard application of photonic quantum interferometry is to improve the image resolution by a factor of N. The increased resolution that can be achieved with N00N states is illustrated by considering photon interference in a Mach-Zehnder interferometer.

Figure 1:
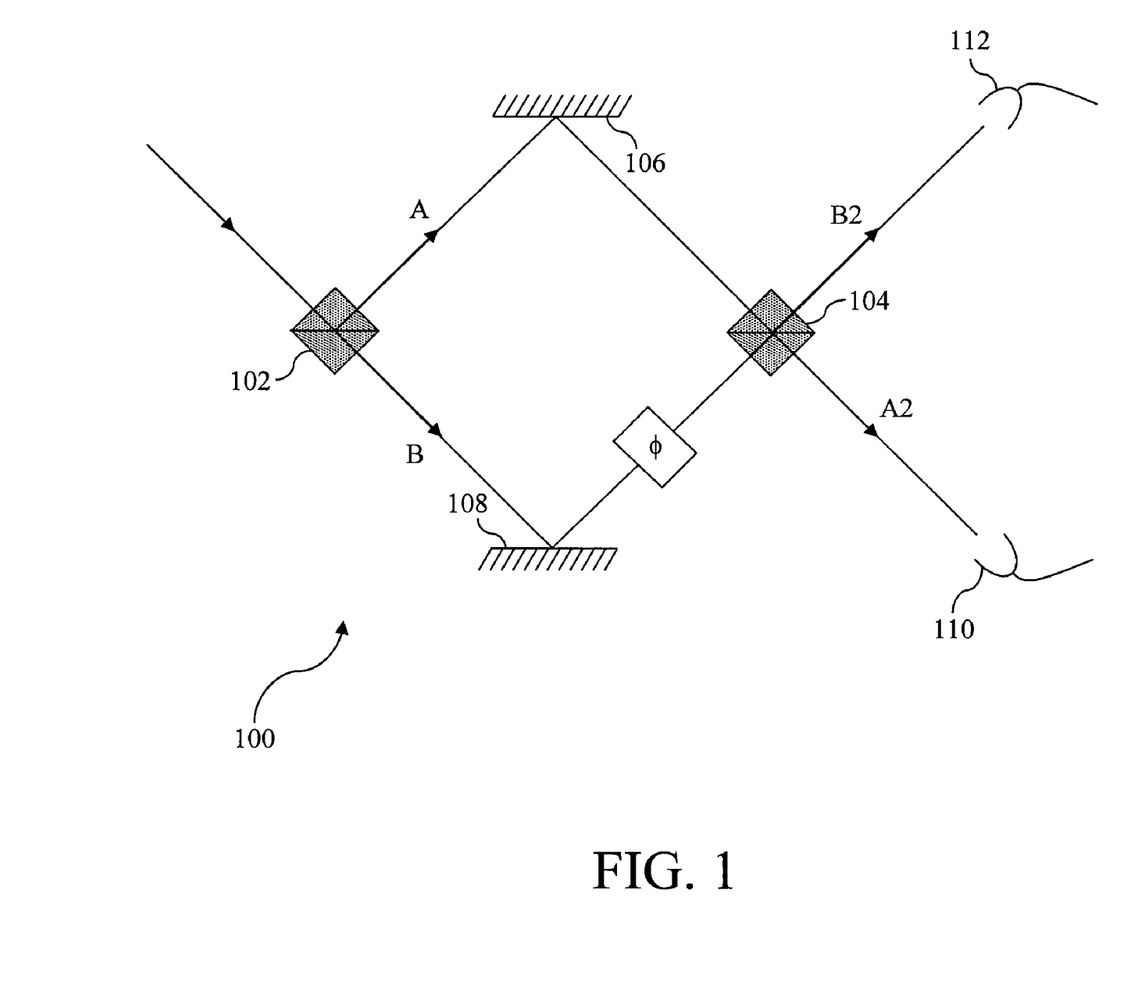
FIG. 1 is a block diagram of an exemplary Mach-Zehnder interferometer.

FIG. 1 depicts an exemplary Mach-Zehnder interferometer 100. Interferometer 100 includes a first beamsplitter 102, a second beamsplitter 104, a first mirror 106, and a second mirror 108. Light entering first beamsplitter 102 is split between two paths, path A and path B. The portion of light traveling along path A reflects off first mirror 106 toward second beamsplitter 104. Light traveling along path A passes through second beamsplitter 104 and is accordingly split between paths A2 and B2. The portion of light traveling along path B reflects off second mirror 108 toward second beamsplitter 104. Light traveling along path B passes through second beamsplitter 104 and is accordingly split between paths A2 and B2. Light in path A2 may be collected by a first photon detector 110. Light in path B2 may be collected by a second photon detector 112.

In interferometer 100, a relative phase difference $\phi$ accumulates in path B. The relative phase difference can arise as the result of the presence of an object in the path, or of a difference in path length, or both. In the case of a single photon sent through interferometer 100, the detection probabilities of the two paths are given, respectively, by:

$$P_{A2} \propto 1 + \cos\phi \quad \text{(Eq. 4)}$$

and $$P_{B2} \propto 1 - \cos\phi. \quad \text{(Eq. 5)}$$

For N00N states, however, the amount of accumulated phase shift is proportional to N such that the state of the signal before the second beamsplitter is given by $$|\psi\rangle = \frac{1}{\sqrt{2}}(|N_A 0_B\rangle + e^{iN\phi}|0_A N_B\rangle). \quad \text{(Eq. 6)}$$

The corresponding detection probabilities are thus given by:

$$P_{A2} \propto 1 + \cos N\phi \quad \text{(Eq. 7)}$$

and $$P_{B2} \propto 1 - \cos N\phi. \quad \text{(Eq. 8)}$$

As such, N00N states exhibit an effective wavelength:

$$\lambda_{N00N} = \frac{\lambda}{N}, \quad \text{(Eq. 9)}$$

which results in the above-claimed N-fold enhancement in resolution (e.g., Eq. 2). In order to take advantage of the effective wavelength associated to N00N states, a suitable N-entangled photon detection technique must be utilized. This can be accomplished, for example, by making use of coincidence detection and appropriate post-processing of signal data, or by making use of suitable sensors that exhibit signatures that are directly responsive to N-photon processes.

In previously-considered quantum interferometric applications, improved resolution is more important than size and weight of the system. In satellite imaging, however, size and weight of the equipment aboard the satellite are of increased importance. If the properties of entangled photons are put to use in a long-range imaging system according to embodiments of the present invention, the resolution enhancement offered by using entangled photons may be traded off for a reduction in imaging system size. This is because the resolution of a quantum interferometric optical system is related to the size of the transmission aperture. That is, rather than using entangled photons to increase resolution from an initial resolution when using a given sensor, entangled photons may instead be used to decrease the size of the transmission aperture needed to transmit the photons while maintaining the initial resolution.

Although quantum mechanical N-photon entangled signal states are utilized, the resolution remains as that constrained by the classical Rayleigh limit on resolution:

$$R_R(D) \cong \frac{\lambda}{D}, \quad \text{(Eq. 10)}$$

where Eq. 10 differs from Eq. 1 by emphasizing the dependence on aperture size, D. The use of entangled photonic signal states can achieve the Heisenberg limit on resolution given by:

$$R_H(D) \cong \frac{\lambda}{ND}. \quad \text{(Eq. 11)}$$

Figure 4:
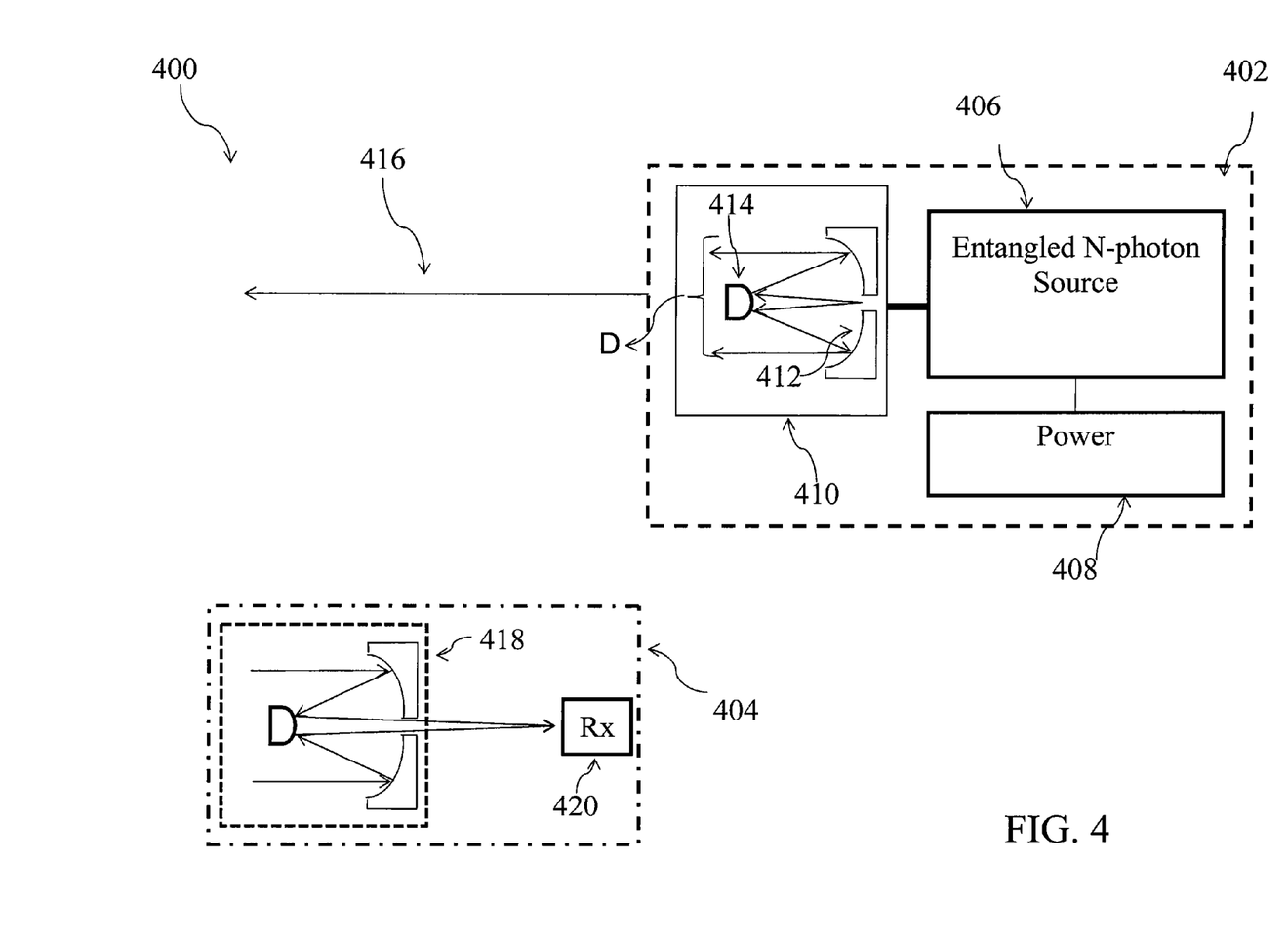
FIG. 4 is an illustration of a satellite-based imaging system according to an embodiment of the present invention.

Even though entangled signal states are utilized, the objective is to retain the resolution $R_R$. As will be illustrated below with respect to FIG. 4, this can be accomplished by replacing the aperture of size D with a smaller aperture of size D'=D/N, such that:

$$R_H(D') \cong \frac{\lambda}{N\left(\frac{D}{N}\right)} \cong R_R(D). \quad \text{(Eq. 12)}$$

In this manner, the objective of obtaining image resolution at the classical Rayleigh limit but with the advantage of a smaller aperture may be achieved.

Explained in a different manner, photons within a N00N-state share information in a way beyond what is possible classically. If two photons are entangled, the pair of photons has about twice as much energy as a single classical photon carrying the same information. When a pair of entangled photons is received by a receiver, the increase in energy provided by the two photons makes receiving the entangled photons substantially equivalent to receiving a single classical photon carrying the information but having a higher frequency. Since the single photon equivalent has a higher frequency, the single photon equivalent has an effective wavelength that is less than the wavelength of the entangled photons. In a classical imaging system, use of a lower wavelength photon allows a smaller diameter aperture to be used to achieve a given resolution. Since the use of entangled photons is substantially the equivalent of using a lower wavelength photon, this allows a corresponding reduction in the size and weight of the imaging system. This exploitation of entanglement to achieve a reduction in the size of an imaging system will be referred to herein as quantum sensor miniaturization.

III. Entangling Photons

Figure 2:
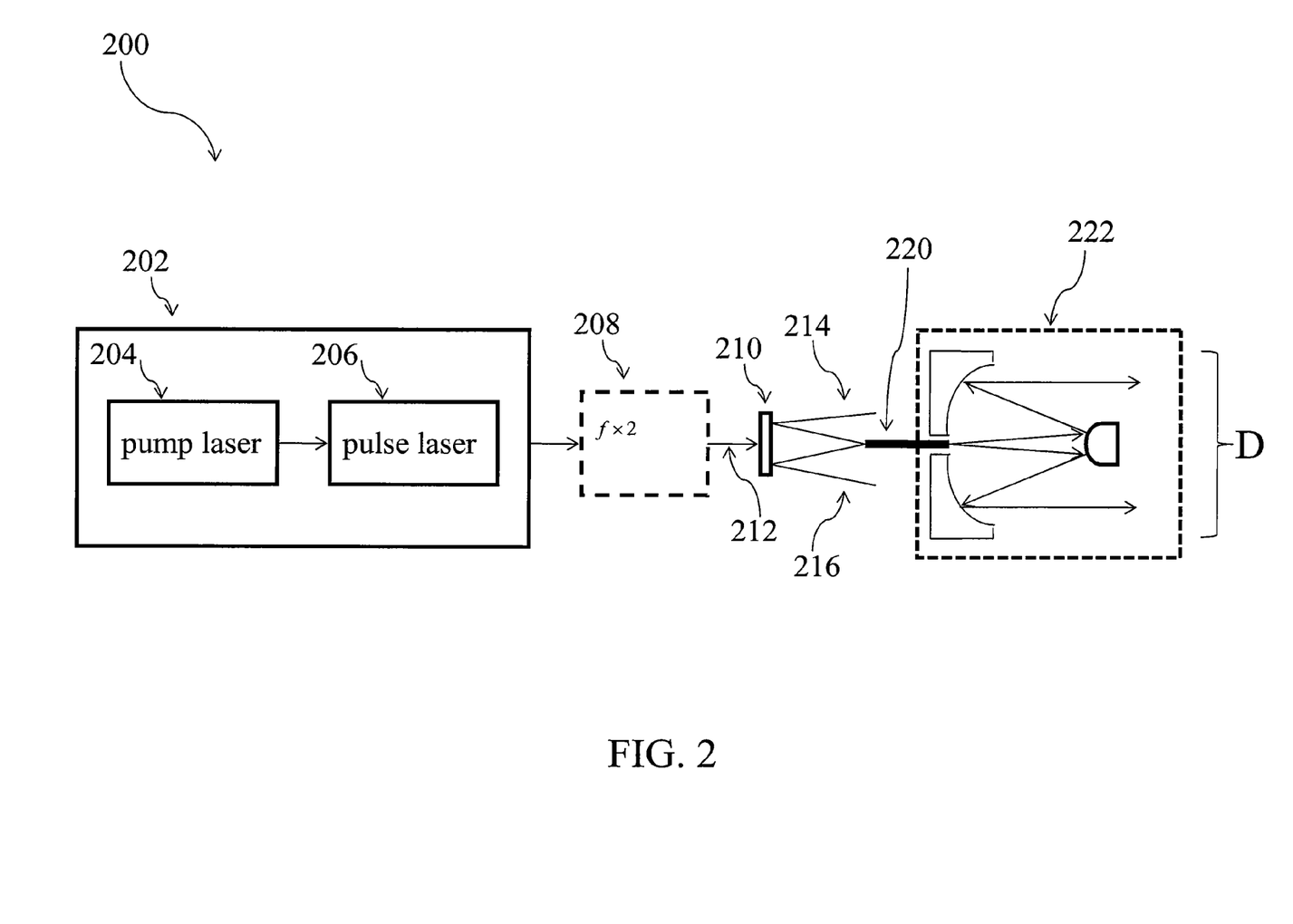
FIG. 2 is a block diagram of an exemplary parametric down conversion system.

Several methods of generating entangled photons exist. One such method is Type-II parametric down conversion. Although embodiments of the present invention will be described with reference to Type-II parametric down conversion, one of skill in the art will recognize that other methods of generating entangled photons may be used without departing from the spirit and scope of the present invention. FIG. 2 is a block diagram of an exemplary parametric down conversion system 200. In system 200, a source 202 generates a beam of coherent light, such that the photons in the beam share the same properties.

In an embodiment, source 202 includes one or more lasers. For example, in the embodiment of FIG. 2, source 202 may include a pump laser 204 for generating a powerful, continuous beam of light. Light emitted from pump laser 204 then enters a pulse laser 206, such as a titanium-sapphire (Ti:Sapph) laser. Pulse laser 206 emits pulses of light at steady intervals. This combination creates pulses with a large population of coherent photons.

System 200 may optionally include a frequency doubler 208, so that a given wavelength of light from source 202 is decreased. Frequency doubler 208 results in coherent photons with half the original wavelength and twice the energy.

The light pulses from source 202 (or from frequency doubler 208 if used) irradiate a parametric down conversion crystal 210. A parametric down conversion crystal is made from non-linear optical material that causes light to propagate with different orientations and/or characteristics in the crystal depending on the entry point of the light. Exemplary types of non-linear crystals that may be used for Type-II parametric down conversion include, for example and without limitation, barium borate (BBO) crystals, bismuth barium borate (BiBO) crystals, and lithium borate (LBO) crystals. As illustrated in FIG. 2, although a single beam of light 212 is input into parametric down conversion crystal 210, crystal 210 outputs a pair of light cones 214 and 216 having an angle with respect to each other. The axes of the two cones of light are not colinear but the two cones of light overlap. One cone of light has photons of a first polarization (e.g., horizontal), and the other cone of light has photons of a polarization orthogonal to the first polarization (e.g., vertical). Entangled photons may be found at the points where the light cones output by the parametric down conversion crystal overlap.

Figure 3:
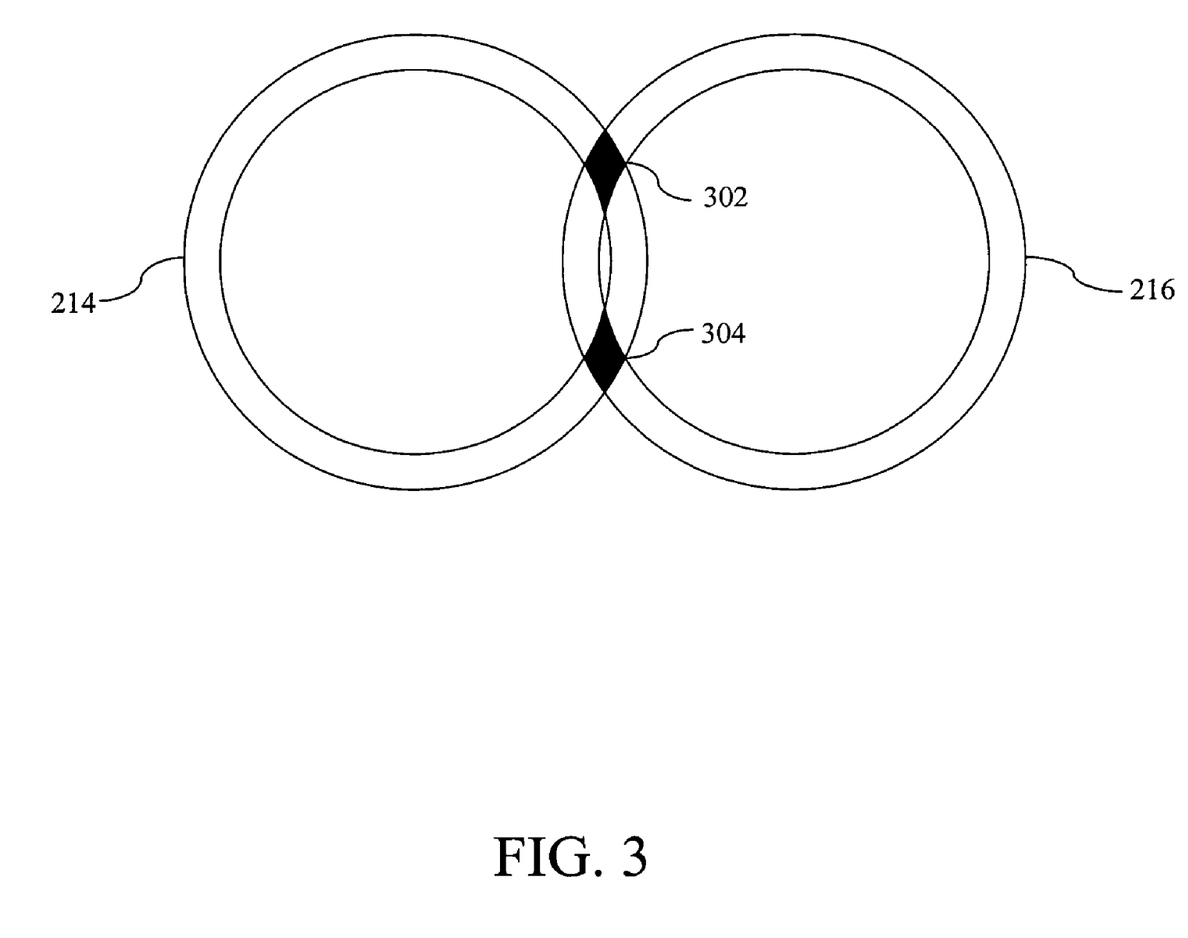
FIG. 3 is an illustration of the location of entangled photons produced by the parametric down conversion system of FIG. 2.

FIG. 3 is a cross-sectional illustration showing pair of light cones 214 and 216. FIG. 3 provides the cross-sectional perspective looking back through parametric down conversion crystal 210 toward source 202. The areas in which cones 214 and 216 intersect (locations 302 and 304) are the areas in which entangled photons produced by parametric down conversion crystal 210 may be found.

Returning to FIG. 2, system 200 further includes an entangled photon collection device 220 to collect the entangled photons produced by the parametric down conversion crystal. Entangled photon collection device 220 may include, for example and without limitation, a fiber optic cable having inputs positioned at the points of overlap between beams 214 and 216, such as locations 302 and 304 of FIG. 3. Entangled photon collection device 220 is coupled to transmitting optics 222. Transmitting optics 222, including a telescope with an aperture of size D, transmit the entangled photons out of system 200.

Further details regarding parametric down conversion may be found in "Generation of Correlated Photon Pairs in Type-II Parametric Down Conversion—Revisited," Kurtsiefer, C. et al., *Journal of Modern Optics*, vol. 48, no. 13, pp. 1997-2007 (2001), which is incorporated by reference herein in its entirety.

IV. Exemplary Imaging System

The possible size and weight savings that can be achieved using quantum sensor miniaturization are now estimated using an exemplary embodiment in which images of ground-based objects are taken by an orbiting satellite. One of skill in the art will recognize that other applications may also benefit from the use of entangled photons, such as satellite communication and use of spacecraft-based systems. Although embodiments of the present invention may also be useful in ground-based systems, particular focus is provided herein on exo-atmospheric systems in which size and weight are at a premium.

As a description of one embodiment, estimated advantages of replacing a traditional photon source with an entangled-photon source will be described using an exemplary, albeit untested, modification of the LIDAR In-space Technology Experiment (LITE). The original LITE system was flown on the Discovery space shuttle in 1994. LIDAR (Light Detecting and Ranging) is a remote sensing technology, analogous to radar, that makes use of laser signals rather than radio waves to perform ranging and other measurements on irradiated targets. The use of optical wavelengths provides advantages over the use of radar in many circumstances. Although embodiments of the present invention will be described using the LITE concept as an example, one of skill in the art will recognize that embodiments may be employed in systems other than a LITE-type system without departing from the spirit and scope of the present invention.

The LITE system, as built, employed a 1-m diameter telescope as a transmitter. The LITE system photon source was a Nd:YAG laser, the output of which was doubled and tripled to produce wavelengths of 1064 nm, 532 nm, and 355 nm.

An embodiment of the present invention modifies the LITE system so as to use entangled photonic N00N states with N=2 as signals. The proposed LITE system will be distinguished from the existing LITE system herein as "entangled-LITE." The use of N00N-state signals in entangled-LITE, rather than the standard laser signals used in the existing LITE, retains the advantages of the use of LIDAR over radar. Entangled light functions in much the same way as separable states of light, with relatively few modifications needed to enable a meaningful system improvement.

FIG. 4 illustrates an entangled-LITE measurement system 400 according to an embodiment of the present invention. Although an actual test has not yet been performed as of the time of filing, estimates of expected results are provided herein. Model system 400 includes an entangled photon beam transmitter 402 and a receiver system 404. Entangled photon beam transmitter 402 includes an entangled N-photon source 406 coupled to a power source 408. Entangled N-photon source 406 may include various optical components as necessary to produce entangled N-photon N00N states, such as a non-entangled photon source and an entanglement system as described above with respect to FIG. 2. Since weight and size are considerations, a non-entangled photon source such as, for example, a vertical cavity surface emitting laser (VCSEL) or an array thereof may be used. Transmitter optical system 410 includes a telescope of aperture size D, and may include, for example and without limitation, a collimator to align the entangled photons. Optical system 410 is shown to have a traditional Cassegrain configuration, which includes a primary mirror 412 and a secondary mirror 414. One of skill in the art will recognize that optical system 410 may be any one of a number of telescope configurations, such as Newtonian, Schmidt-Cassegrain, Maksutov, etc. A beam of entangled photons 416 is output by entangled photon beam transmitter 402 toward an object of interest.

Receiver system 404 includes an optical system 418, such as a telescope, and an entangled photon detection apparatus 420. Entangled photon detection apparatus 420 may make use of, for example, coincidence detection and appropriate post-processing of signal data, or may make use of suitable sensors that exhibit signatures that are directly responsive to N-photon processes.

In the embodiment illustrated in FIG. 4, receiver system 404 is located on the same optical platform (e.g., a satellite) as entangled photon beam transmitter 402. However, receiver system 404 may be located on an optical platform separate from entangled photon beam transmitter 402. For example, receiver system 404 may be located on a separate ground-based platform or exo-atmospheric platform.

If a non-entangled photon source were used instead of entangled N-photon source 406, a geometry would be selected with primary mirror 412 having diameter D to enable the desired resolution. If a resolution available with the non-entangled photon source were to be maintained, the use of entangled N-photon signals output by entangled N-photon source 406 would enable a reduction in the transmitter aperture (i.e., diameter of mirror 412) from D (the effective diameter) to D/N (the actual diameter). This would reduce the cross-sectional area of the optic by approximately a factor of $N^2$. This in turn would reduce the mass of the optic by approximately the same factor, neglecting for simplicity the reduced thickness needed to ensure that the optic maintain its figure against its own weight. For entangled photon signals with N=2, for example, this should lead to a reduction in weight by at least a factor of 4 due to the reduced size of the optic.

In this scenario, the logic leading to Eq. 12 above indicates that the effective system resolution can be maintained while halving the actual size of the telescope optic, such as primary mirror 412, leading to an approximate weight reduction by a factor of 4. In addition to considerations involving the optic, one of skill in the art can explore various possible laser sources in connection with a system similar to the entangled-LITE system, including, for example and without limitation, Nd:YAG, Ti:Sapphire, or any of a variety of violet (Ga—N) to cyan lasers, without departing from the spirit and scope of the present invention. Regarding the source of entangled photons when parametric down conversion is used, different spontaneous parametric down conversion crystals may be considered, including, for example and without limitation, lithium borate, barium borate, or bismuth borate. Methods of producing entangled photons other than parametric down conversion may also be considered. As noted above, equipment for an entangled-LITE embodiment includes hardware needed to confirm the detection of entangled photons, such as, for example and without limitation, N-photon detectors, coincidence circuits, etc. An exemplary comparison of these estimated parameters is given in Table 1:

TABLE 1

| | LITE | Entangled-LITE |
|---|---|---|
| T/R Optics | 1 m telescope | .5 m telescope |
| Lasers | Nd:YAG | Nd:YAG, Ti:Sapph, etc. |
| Crystal | C*DA, KD*P | BBO, BiBO, LBO |
| Imaging Hardware | non-entangled light | N = 2 N00N-states |

V. Exemplary Methods

Figure 5:
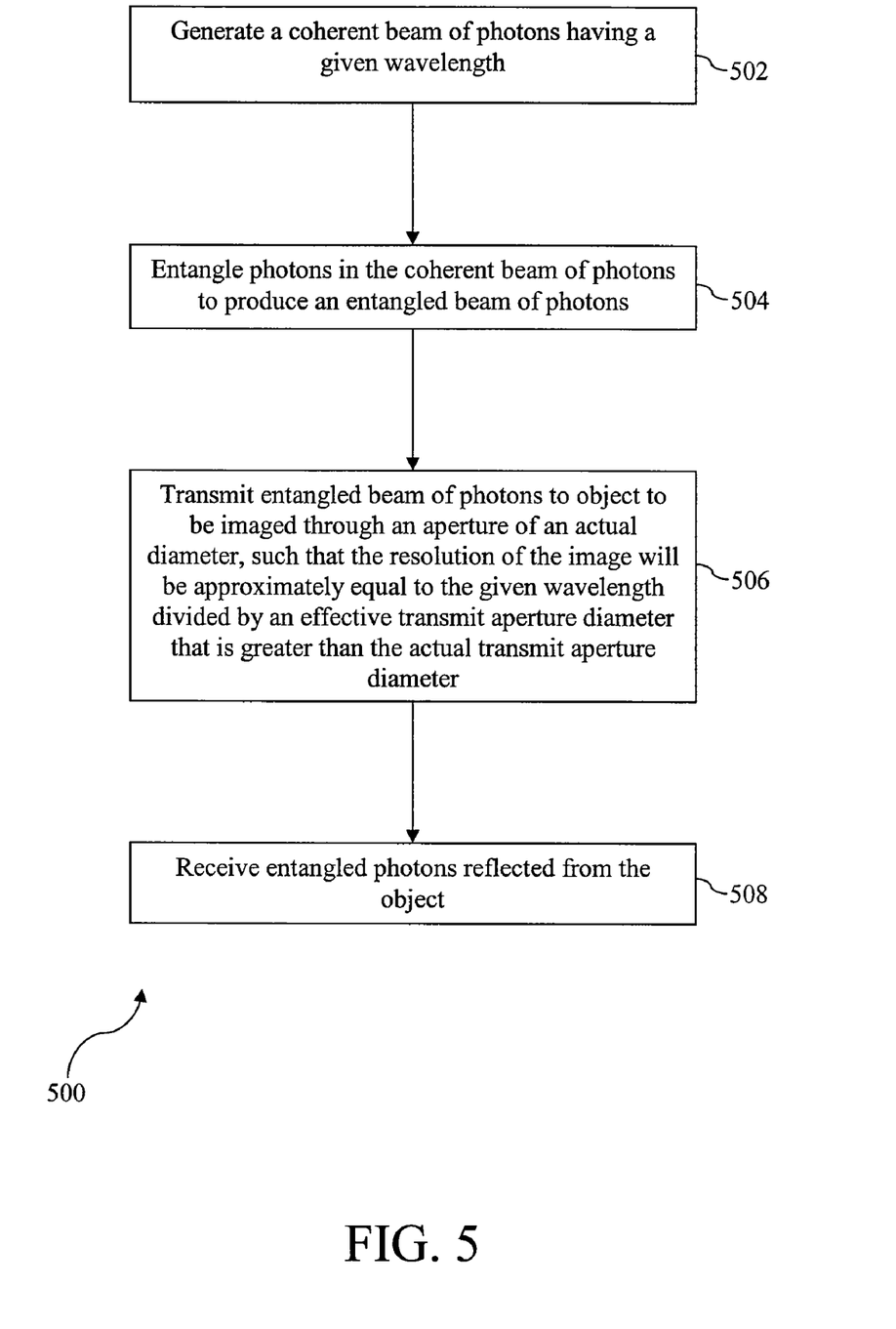
FIG. 5 is a flowchart of a method for imaging an object according to an embodiment of the present invention.

FIG. 5 is a flowchart of an exemplary method 500 for imaging an object, according to an embodiment of the present invention. In step 502, a coherent beam of photons having a given wavelength is generated. The beam of photons may be generated using, for example, source 202 shown in FIG. 2.

In step 504, once the beam of photons has been generated, photons in the coherent beam of photons are entangled. Photons in the beam of photons may be entangled using, for example, parametric down conversion crystal 210 shown in FIG. 2. The entangled photons may then be separated from the initial beam of photons to produce an entangled beam of photons.

In step 506, the entangled beam of photons is transmitted through an aperture having an actual diameter to an object to be imaged or otherwise measured. Step 506 may occur using either a ground-based transmitter or an exo-atmospheric transmitter, such as a satellite or spacecraft.

In step 508, entangled photons reflected from the object are received and detected. The entangled photons may be received by, for example, a ground-based receiver or an exo-atmospheric transmitter, such as aboard a satellite or spacecraft.

The resolution R of the image produced by irradiating the target with the entangled photons is approximately equal to the wavelength of the photons divided by an effective transmitting aperture diameter (e.g., D) that is greater than the actual diameter (e.g., D/N) of the transmitting aperture. The effective aperture diameter is correlated to the Rayleigh limit of the resolution:

$$D_{effective} \cong \frac{\lambda}{R},$$ (eq. 13)

while the actual diameter of the aperture is correlated to the Heisenberg limit of the resolution:

$$D_{actual} \cong \frac{\lambda}{NR}.$$ (eq. 14)

VI. Atmospheric Attenuation

The entanglement of photonic N00N states is very susceptible to degradation by atmospheric attenuation. Small-N N00N states, such as N=2 N00N states, are not affected by atmospheric degradation as badly as higher-N N00N states. However, large values of N are needed to achieve meaningful improvement in resolution using entangled photon systems. In existing imaging and measurement systems, resolution is typically a primary concern, and the relatively modest increase of resolution available at N=2 is unlikely worth the cost of replacing current systems to improve resolution. As such, use of entangled photons has not previously been considered in such imaging and measurement systems.

However, the inventors have discovered that the atmospheric degradation of N00N states is a less severe problem when the goal is not to improve resolution but instead to reduce the size and weight of the sensor apparatus. This is because it is possible to obtain meaningful reductions in size and weight even for values of N as small as N=2. Thus, quantum sensor miniaturization as described herein can be viable in the presence of atmospheric attenuation, even in circumstances for which improvement in entanglement-enhanced image resolution is not viable.

It is noted that there are alternative types of entangled states besides path-entangled states N00N states. It would be obvious to one of skill in the art that specific realizations of imaging sensor hardware to make use of entangled photon states other than photonic N00N states may be implemented without departing from the spirit and scope of the present invention.

Additionally, N00N-state-based quantum sensor miniaturization can offer significant weight and size reductions in fully exo-atmospheric scenarios (e.g., satellite-to-satellite) in which atmospheric attenuation does not play a role.

VII. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system for optical imaging, comprising:
   a photon source configured to emit a beam of photons at a given wavelength;
   a photon entanglement system configured to receive the beam of photons and emit a beam of entangled photons;
   a transmitter having an aperture with an actual aperture diameter, the transmitter configured to transmit the beam of entangled photons, the beam providing a resolution approximately equal to the given wavelength divided by an effective aperture diameter that is greater than the actual aperture diameter; and
   an entangled-state photon detector.

2. The system of claim 1, wherein the effective aperture diameter is correlated to the Rayleigh limit for the resolution, and the actual aperture diameter is correlated to the Heisenberg limit for the resolution.

3. The system of claim 1, wherein the photon entanglement system is a parametric down conversion system.

4. The system of claim 1, wherein the photon entanglement system produces entangled photons having N00N states of N=2, wherein N is the number of photons in each entangled photon group.

5. The system of claim 4, wherein the effective aperture diameter is approximately two times the size of the actual aperture diameter.

6. The system of claim 1, wherein the effective aperture diameter is approximately N times greater than the actual aperture diameter, wherein N is the number of photons in each entangled photon group.

7. The system of claim 1, wherein the photon entanglement system and the transmitter are located on a first satellite.

8. The system of claim 7, wherein the detector is located on the first satellite.

9. The system of claim 8, further comprising a collimator configured to align the beam of entangled photons with the detector.

10. The system of claim 7, wherein the detector is located on a second satellite.

11. The system of claim 7, wherein the detector is a ground-based receiver.

12. A method for optical imaging, comprising:
generating a beam of photons having a given wavelength;
entangling photons in the beam of photons to produce an entangled beam of photons;
transmitting the entangled beam of photons to an object to be imaged through an aperture at a resolution approximately equal to the given wavelength divided by an effective aperture diameter that is greater than an actual diameter of the aperture; and
receiving entangled photons reflected from the object.

13. The method of claim 12, further comprising detecting the entangled photons reflected from the object with an entangled photon detection apparatus.

14. The method of claim 12, wherein the effective transmit aperture diameter is correlated to the Rayleigh limit for the resolution, and the actual diameter of the aperture is correlated to the Heisenberg limit for the resolution.

15. The method of claim 12, wherein the entangling photons comprises passing the beam of photons through a parametric down conversion crystal.

16. The method of claim 15, wherein the entangling photons comprises generating entangled photons having N00N states of N=2, wherein N is the number of photons in each entangled photon group.

17. The method of claim 16, wherein the transmitting entangled photons enables a resolution approximately equal to the given wavelength divided by an effective aperture diameter that is approximately two times greater than the actual diameter of the aperture.

18. The method of claim 12, wherein the transmitting entangled photons enables a resolution approximately equal to the given wavelength divided by an effective aperture diameter that is approximately N times greater than the actual diameter of the aperture, wherein N is the number of photons in each entangled photon group.

19. The method of claim 12, wherein the transmitting comprises transmitting the entangled beam of photons through a planetary atmosphere to the object to be imaged.

20. A system for optical imaging, comprising:
an exo-atmospheric source of entangled photons having a given wavelength;
a transmitter configured to transmit the entangled photons through a planetary atmosphere, wherein the size of an aperture of the transmitter is dependent upon a state of entangled photons from the source of entangled photons;
an exo-atmospheric receiver having a predetermined resolution; and
an entangled photon detection apparatus.

21. The system of claim 20, wherein the state of entangled photons is N00N state of N=2, wherein N is the number of photons in each entangled photon group.

22. The system of claim 20, wherein the exo-atmospheric source of entangled photons includes a parametric down conversion crystal.

* * * * *